US 8,510,501 B2

(12) United States Patent
Lou et al.

(10) Patent No.: US 8,510,501 B2
(45) Date of Patent: Aug. 13, 2013

(54) WRITE-PROTECTION SYSTEM AND METHOD THEREOF

(75) Inventors: Yun Lou, Shenzhen (CN); Hung-Ju Chen, Tu-Cheng (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 275 days.

(21) Appl. No.: 12/981,217

(22) Filed: Dec. 29, 2010

(65) Prior Publication Data

US 2012/0117308 A1    May 10, 2012

(30) Foreign Application Priority Data

Nov. 10, 2010   (CN) .......................... 2010 1 0538715

(51) Int. Cl.
    *G06F 12/14*    (2006.01)
(52) U.S. Cl.
    USPC .................. 711/103; 711/163; 711/E12.008; 711/102; 711/E12.091

(58) Field of Classification Search
    USPC .................. 711/103, 163, E12.008, E12.091, 711/102
    See application file for complete search history.

(56) References Cited

U.S. PATENT DOCUMENTS

| | | | |
|---|---|---|---|
| 2007/0079094 A1* | 4/2007 | Wang | 711/163 |
| 2010/0088547 A1* | 4/2010 | Chang | 714/36 |
| 2010/0191905 A1* | 7/2010 | Tsurumi | 711/112 |
| 2011/0047316 A1* | 2/2011 | Farhan et al. | 711/103 |
| 2011/0099556 A1* | 4/2011 | Long et al. | 719/312 |

* cited by examiner

*Primary Examiner* — Mardochee Chery
(74) *Attorney, Agent, or Firm* — Altis Law Group, Inc.

(57) ABSTRACT

A data protection device includes a basic input output system chip and a main control chip. The basic input output system chip stores basic input output system program and includes a write protection pin and a plurality of status registers. The main control chip includes a plurality of general purpose input output pins. One general purpose input output pin is electrically connected to the write protection pin of the basic input output system chip, the voltage level of the general purpose input output pin is controlled by performing different command programs of the basic input output system program, and the status registers and the basic input output system chip are selectable to be in a write protection mode or a writable mode under the control of the voltage level of the write protection pin of the basic input output system chip.

16 Claims, 2 Drawing Sheets

WRITE-PROTECTION SYSTEM AND METHOD THEREOF

BACKGROUND

1. Technical field

The disclosure generally relates to data protection devices, and more particularly relates to, a data protection device used in a basic input output system (BIOS) chip of a computer system and data protection method thereof.

2. Description of the Related Art

BIOS chips are built into computer systems and provide the most basic and direct controls for the computer systems. The BIOS chip provides a small library of basic input/output functions and is used to store basic programs such as self-diagnostic test program, system bootstrap program and interrupt service program, to further operate and control the peripherals such as keyboard and text display, and these library functions are callable by external software. Therefore, if the program data in the BIOS chip is lost or destroyed, the computer system cannot operate normally.

There are mainly two kinds of protection methods for the BIOS chip: software protection and hardware protection. Since the source code or protocol of the software is easily accessible, the software may be subject to computer virus attacks, allowing corruption or loss of internal data. Thus, the security of the software protection method is poor. The hardware protection method involves the use of jumpers to enable or disable write protection of the BIOS chip. However, in the write protection mode, the BIOS chip cannot be updated, which is inconvenient.

Therefore, there is room for improvement within the art.

BRIEF DESCRIPTION OF THE DRAWINGS

Many aspects of an exemplary write-protection system and method thereof can be better understood with reference to the following drawings. The components in the drawings are not necessarily drawn to scale, the emphasis instead being placed upon clearly illustrating the principles of the exemplary write-protection system and method thereof. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
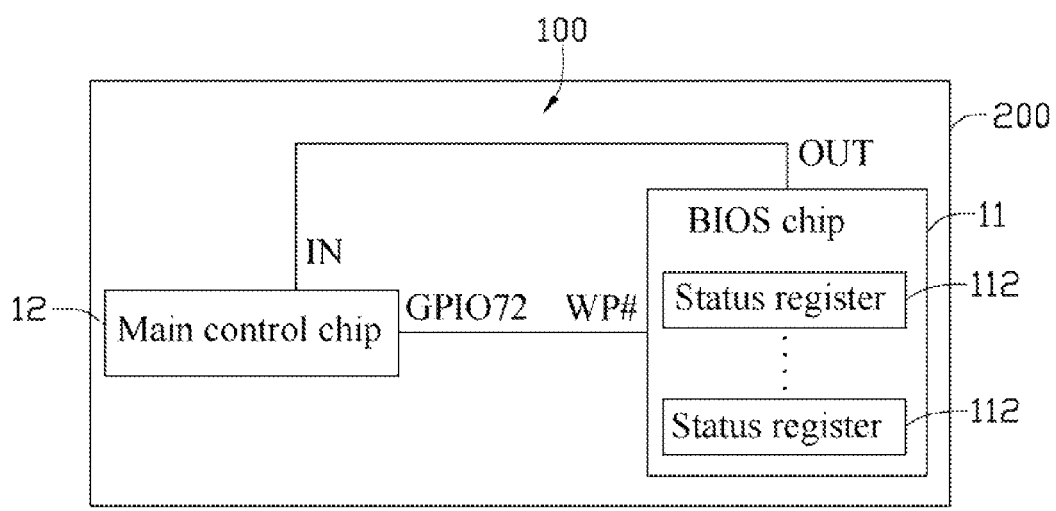
FIG. 1 is a block view of a data protection device used in a computer system, according to an exemplary embodiment.

FIG. 1 shows an exemplary embodiment of a data protection device 100 used in a computer system 200 to protect internal data of the computer system 200 from being corrupted or lost. The data protection device 100 includes a basic input output system (BIOS) chip 11 and a main control chip 12 electrically connected to the BIOS chip 11.

The BIOS chip 11 can be an erasable programmable read only memory (EPROM), a programmable read only memory (PROM), or a flash memory, which is built into the mainboard of the computer system 200 and is capable of storing a BIOS program. The BIOS chip 11 includes a plurality of status registers 112, such as block protect bit0 (BP0) register, BP1 register, BP2 register and status register write disable (SRWD) register, for controlling read-write status of the BIOS chip 11.

The BIOS program is the first code run by the computer system 200 when the computer system 200 is powered on to load and start an operation system. When the computer system 200 starts up, the first job for the BIOS program is to initialize and identify system devices such as memory, hard disk, central processing unit (CPU) and other hardware. The BIOS then locates software held on a boot device, such as a hard disk or a compact disc (CD), and loads and executes that software, giving it control of the computer system 200. The BIOS chip 11 further includes a write protection pin WP# and an output pin OUT, and the write protection pin WP# is a low enabled pin. In this exemplary embodiment, the BIOS program includes a head command program block, an application program block, and a tail command program block. The data content of the BIOS chip 11 can be rewritten allowing the BIOS program to be updated.

The main control chip 12 can be a south bridge chip and includes a plurality of general purpose input output (GPIO) pins. In this exemplary embodiment, the GPIO pin 72 is electrically connected to the write protection pin WP#, and an input pin IN is electrically connected to the output pin OUT of the BIOD chip 11. When the head command program block is performed, the output pin OUT of the BIOS chip 11 sends a first command signal to the input pin IN of the main control chip 12, so that the voltage level of the GPIO pin 72 is set to high. Thus, the status registers 112 are in a writable mode, and the BIOS chip 11 is accessible and is writable with different program data, allowing the application program block in the BIOS chip 11 to update data in real time if needed and allow the computer system 200 to function.

In addition, when the tail command program block is performed, the output pin OUT of the BIOS chip 11 sends a second command signal to the input pin IN of the main control chip 12, so that the voltage level of the GIOP pin 72 is set to be low, and the write protection pin WP# is enabled. Thus, the BP1 register, the BP2 register, and the SRWD register are in a write protection mode, and the BIOS chip 11 is protected from computer virus attack.

Figure 2:
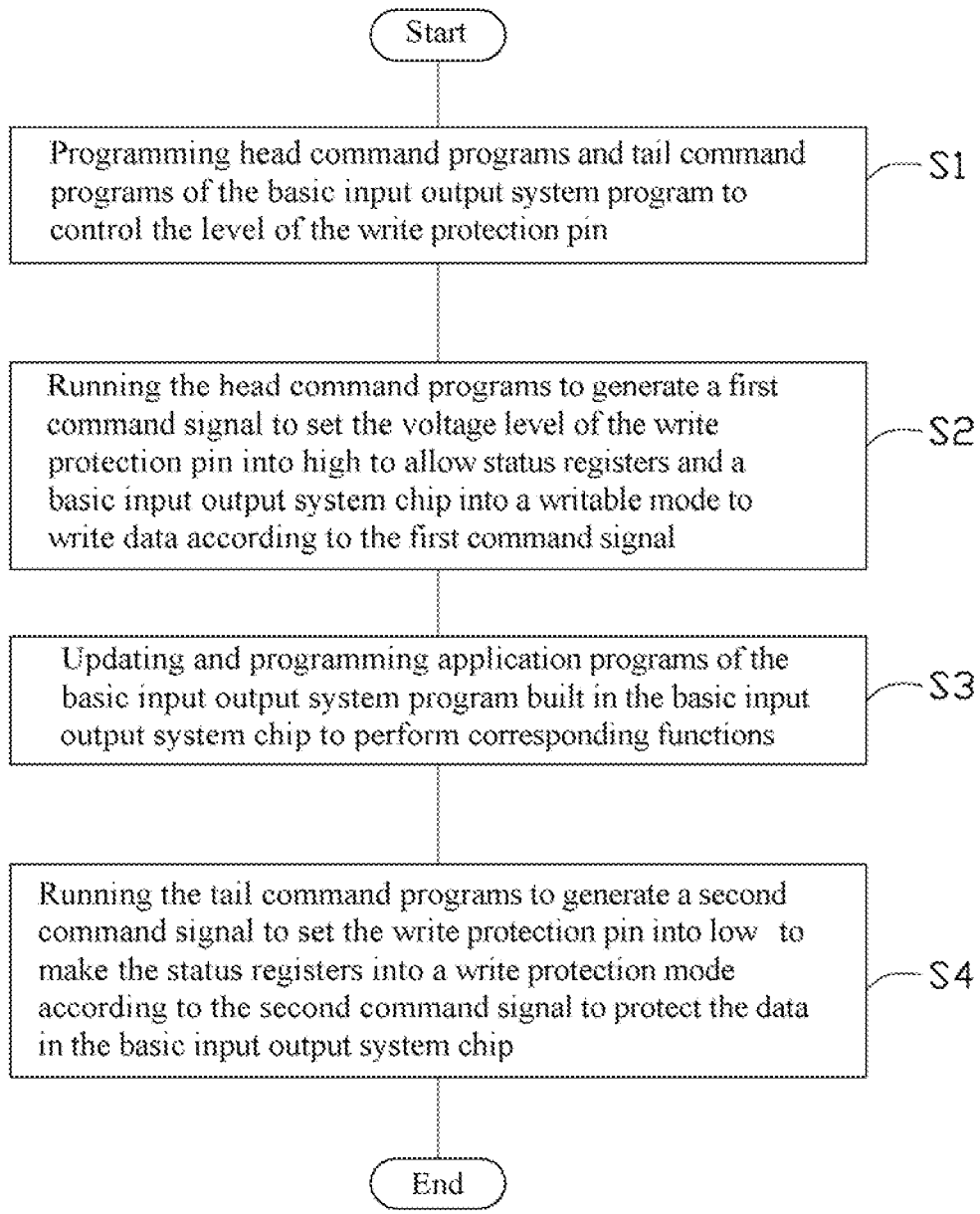
FIG. 2 is a flowchart illustrating a data protection method, according to an exemplary embodiment.

Also referring to FIG. 2, a data protection method according to an exemplary embodiment is depicted. The data protection method can use the aforementioned data protection device 100 and may at least include the following steps.

In step S1, the head command program block and the tail command program block of the BIOS program in the BIOS chip 11 is programmed to control the voltage level of the write protection pin WP#.

In step S2, the head command program block is run to accordingly generate a corresponding first command signal, the GPIO pin 72 and the write protection pin WP# are set to high according to the first command signal, so the BP0 register, the BP1 register, the BP2 register and the SRWD register of the BIOS chip 11 are in the writable mode, and the BIOS chip 11 is accessible and writable with different data.

In step S3, the contents of the application program block in the BIOS program are run and, if needed, updated.

In step S4, the tail command program block is run accordingly to generate a corresponding second command signal, the GPIO pin 72 and the write protection pin WP# are set to low according to the second command signal, so the BP0 register, the BP1 register, the BP2 register and the SRWD register of the BIOS chip 11 are in the write protection mode, and the BIOS chip 11 is protected from computer virus attack.

In addition, the data content of the BIOS chip 11 can be rewritten allowing the BIOS software to be updated or upgraded.

In summary, in the data protection device 100 of the exemplary embodiment, the GPIO pin 72 of the main control chip 12 is electrically connected to the write protection pin WP# of the BIOS chip 11 to selectably control the voltage level of the write protection pin WP#. Thus, when the GPIO pin 72 is set to high, the write protection pin WP# is high and is disabled, so that the BIOS chip 11 is in a writable mode and the data in the BIOS chip 11 can be updated. When the GPIO pin 72 is set to low due to the BIOS program, the write protection pin WP# is low and enabled, accordingly, the BIOS chip 11 is then in a write protection mode, preventing from computer virus attacks. Thus, there is no need to use jumpers to control the voltage level of the write protection pin WP#.

The output pin OUT of the BIOS chip 11 and the input pin IN can be input/output pins, which can receive and transmit data.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. A write-protection system used in a computer system, comprising:
   a basic input output system chip storing basic input output system program including different command programs, the basic input output system chip comprising a write protection pin and a plurality of status registers; and
   a main control chip electrically connected to the basic input output system chip, the main control chip comprising a plurality of general purpose input output pins, wherein one general purpose input output pin is electrically connected to the write protection pin of the basic input output system chip, a voltage level of the general purpose input output pin is controlled by initializing the different command programs of the basic input output system program in the basic input output system chip, and the status registers and the basic input output system chip are selectable to be in a write protection mode or a writable mode under the control of the voltage level of the write protection pin of the basic input output system chip.

2. The write-protection system as claimed in claim 1, wherein the basic input output system chip is an erasable programmable read only memory, a programmable read only memory, or a flash memory.

3. The write-protection system as claimed in claim 1, wherein the status registers comprise a block protect bit0 register, a block protect bit1, a block protect bit2, and status register write disable register.

4. The write-protection system as claimed in claim 1, wherein the main control chip is a south bridge chip.

5. The write-protection system as claimed in claim 1, wherein the general purpose input output pin connected to the write protection pin is low enabled pin.

6. The write-protection system as claimed in claim 1, wherein the basic input output system chip comprises an output pin, the main control chip comprises an input pin electrically connected to the output pin of the basic input output system chip.

7. The write-protection system as claimed in claim 6, wherein when a head command program block of the command programs is performed, the output pin sends a first command signal to the input pin of the main control chip, the general purpose input output pin is high, the write protection pin is high, so the status registers are in a writable mode, and the basic input output system chip is accessible and is able to write data.

8. The write-protection system as claimed in claim 7, wherein when a tail command program block of the command programs is performed, the output pin sends a second command signal to the input pin of the main control chip, the general purpose input output pin is low, the write protection is low, so the status registers are in a write protection mode, and the basic input output system chip is inaccessible and is unable to write data.

9. A write-protection method, comprising:
   programming head command programs and tail command programs of a basic input output system program to control a voltage level of a write protection pin;
   running the head command programs when the basic input output system program is initializing, to generate a first command signal to set the voltage level of the write protection pin into high to allow status registers and a basic input output system chip into a writable mode to write data according to the first command signal;
   updating and programming application programs of the basic input output system program built in the basic input output system chip to perform corresponding functions; and
   running the tail command programs when the basic input output system program is initializing, to generate a second command signal to set the write protection pin into low to make the status registers into a write protection mode according to the second command signal to protect the data in the basic input output system chip.

10. A write-protection system used in a computer system, comprising:
    a basic input output system chip providing basic input output system program including different command programs, the basic input output system chip comprising a write protection pin and status registers; and
    a main control chip electrically connected to the basic input output system chip, the main control chip comprising a low enabled general purpose input output pin, wherein the general purpose input output pin is electrically connected to the write protection pin of the basic input output system chip, when the basic input output system program is initializing, a voltage level of the general purpose input output pin is controlled by performing the different command programs of the basic input output system program, and when the general purpose input output pin is high, the write protection pin is disabled, the status registers and the basic input output system chip are in writable modes; when the general purpose input output pin is low, the write protection pin is enabled, the status registers and the basic input output system chip are in write protection modes.

11. The write-protection system as claimed in claim 10, wherein the basic input output system chip is an erasable programmable read only memory, a programmable read only memory, or a flash memory.

12. The write-protection system as claimed in claim 10, wherein the status registers are capable of controlling read-write status of the basic input output system chip and comprises a block protect bit0 register, a block protect bit1, a block protect bit2, and status register write disable register.

13. The write-protection system as claimed in claim 10, wherein the main control chip is a south bridge chip, and the general purpose input output pin connected to the write protection pin is low enabled pin.

14. The write-protection system as claimed in claim 10, wherein the basic input output system chip comprises an output pin, the main control chip comprises an input pin electrically connected to the output pin of the basic input output system chip.

15. The write-protection system as claimed in claim 14, wherein when a head command program block of the command programs is performed, the output pin sends a first command signal to the input pin of the main control chip.

16. The write-protection system as claimed in claim 14, wherein when a tail command program block of the command programs is performed, the output pin sends a second command signal to the input pin of the main control chip.

* * * * *